Feb. 9, 1937. J. F. SCHWAB 2,070,373
WEATHER STRIP
Filed Aug. 27, 1932
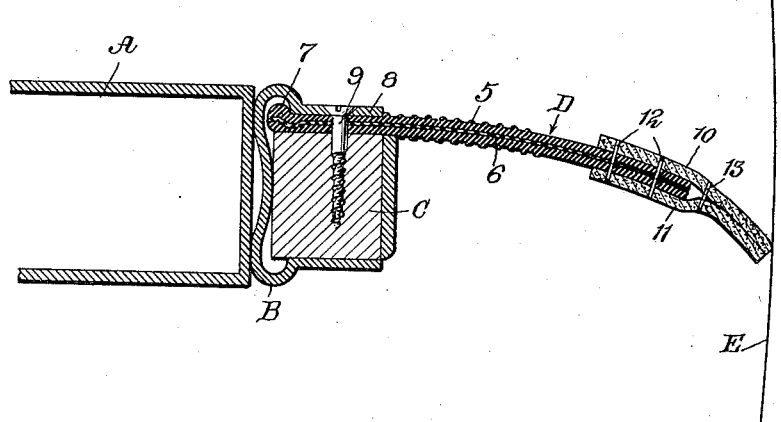
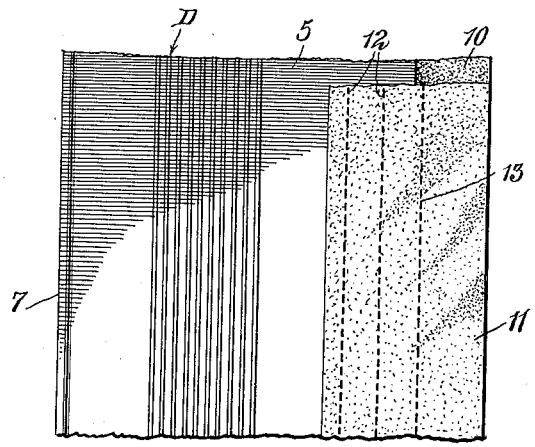
WITNESSES
INVENTOR
Joseph F. Schwab
BY
ATTORNEYS Patented Feb. 9, 1937

2,070,373

UNITED STATES PATENT OFFICE 2,070,373

WEATHER STRIP

Joseph F. Schwab, Brooklyn, N. Y., assignor to Revolving Doors, Inc., New York, N. Y., a corporation of New York Application August 27, 1932, Serial No. 630,726

2 Claims. (Cl. 20—69)

This invention relates to weather strips and, while not necessarily restricted thereto, is especially designed for use at the outer vertical edges of the wings of revolving doors.

The invention aims for its object to provide an improved form of weather strip which, when worn, is reversible and which will function uniformly in its original or reversed positions to obtain an air seal between the door and its enclosure.

More particularly, the invention resides in a weather strip which includes a flexible elastic body portion for reversible anchorage at one of its edges to the edge of the door wing and which is provided at its free edge with independent felt or other suitable wear strips attached to the opposite sides of the free edge of the body and having portions extending therebeyond for selective engagement with the door enclosure when the strip is reversibly mounted on the door wing.

The invention further resides in the provision of a weather strip of the indicated character, in which the wear strips are so constructed, arranged and connected with the body that the wear strip which contacts with the outer enclosure is backed up and reinforced by the other wear strip, wherein the proper tension and impingement of the contacting wear strip are obtained.

Other objects of the invention reside in an improved weather strip which is extremely simple in its construction, inexpensive to produce and which is highly efficient in its purpose.

With the above recited and other objects in view, reference is had to the following description and accompanying drawing, in which there is exhibited one example or embodiment of the invention, while the claims define the actual scope of the same.

In the drawing:

Figure 1 is a fragmentary sectional plan view through a revolving door wing equipped with a weather strip constructed in accordance with the invention and illustrating said strip in operative relation to the enclosure.

Figure 2 is a fragmentary side face view of the improved weather strip.

Referring to the drawing by characters of reference, A designates a portion of the wing of a revolving door, B the channel molding which receives a wooden strip C, and D generally the weather strip. The weather strip D includes an elastic body portion 5, preferably of rubber, having an internal reinforcing fabric 6 and formed at one edge with a marginal bead 7, the beaded edge being designed to be inserted within the channel molding between its leading flange 8 and the wooden strip C, after which screws or other suitable fastening devices 9 are inserted through the flange 8, the weather strip D and anchored in the wooden strip C.

It has been the common practice heretofore to attach to the leading face of the body 6 so as to project beyond the free edge thereof, a single wear strip, preferably of felt, which bears against and effects air tight seal between the door wing and the inner surface E of the door enclosure. Obviously, after the wear strip has been worn to a certain degree, the complete weather strip is discarded and replaced by a new strip.

In order to effect a better performance and at the same time increase the length of life and usefulness of the weather strip structure, the present invention resides in employing a pair of felt or other suitable wear strips 10 and 11 which are secured by lines of stitching 12 or other equivalent means to the opposite faces of the weather strip body 6 adjacent its outer free edge with portions protruding beyond the free edge of the body 6 and secured directly to each other by a line of stitching 13 disposed beyond the free edge of the body 6. By providing the two wear strips as shown, the leading strip, designated by the reference character 10 in Figure 1, has its extended portion backed up and reinforced by the protruding portion of the other wear strip. This adds to the rigidity of the leading wear strip and further permits of the reversal of the complete weather strip D and use of the same in a reversed position to double the length of life thereof while insuring uniform functioning of the weather strip in its original or reversed position.

What is claimed is:

1. A reversible weather strip for doors including an elastic body connected to the edge of the door and projecting laterally therefrom, separate wear strips attached to the outer free edge of the elastic body and projecting therefrom beyond the free edge, means for securing the wear strips to the body, and means for securing the projecting portions of the wear strips to each other immediately beyond the free edge of the body, the free edges of the wear strips being laterally co-extensive and relatively movable laterally in close contact with each other.

2. As a new article of manufacture, a weather strip for the vertical free edges of revolving door wings including an elastic body adapted for anchorage at one of its edges to the door wings, and wear strips disposed on the opposite side faces of the body adjacent its free edge, said wear strips being secured to the body and having portions projecting beyond its free edge, one of said portions engaging with the door enclosure and the other serving as a backing member when the weather strip is mounted in position, the free edges of the wear strips being laterally co-extensive and relatively movable laterally in close contact with each other.

JOSEPH F. SCHWAB.